Aug. 8, 1961 E. S. BURGESS 2,995,653
AMPLIFIER
Filed July 16, 1959
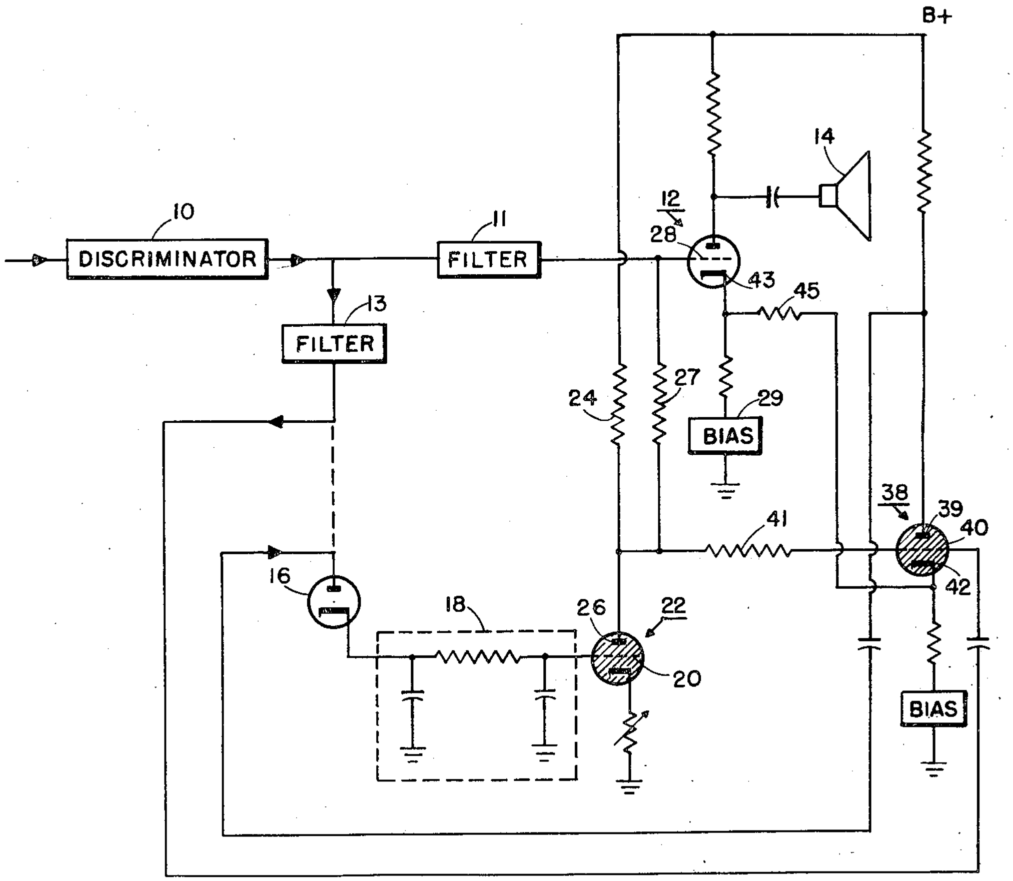
INVENTOR.
EDWARD S. BURGESS
BY Darby & Darby
ATTORNEYS United States Patent Office 2,995,653

Patented Aug. 8, 1961

2,995,653

AMPLIFIER

Edward S. Burgess, Rutherford, N.J., assignor, by mesne assignments, to Fairchild Camera and Instrument Corporation, Syosset, N.Y., a corporation of Delaware Filed July 16, 1959, Ser. No. 827,485
6 Claims. (Cl. 250—20)

This invention relates to an amplifier, and more particularly to an amplifier that coacts with a squelch control circuit.

The following background will aid in understanding my invention. Many radio systems, instead of broadcasting continuously like commercial networks, are of the intermittent broadcasting type, that is, they are in a quiescent "stand-by" state until a message is to be sent. Their receivers therefore are normally quiet, but are ready to reproduce any message that may be received. When these intermittent type systems are of the frequency modulated type or of the phase modulated type, it is an unfortunate inherent characteristic of the receivers that during their quiescent periods, when no message is being received, they develop an objectionable noise. Due to normal frequency or phase modulation receiver action, the noise disappears in the presence of a message. A listener, such as a policeman or a tax driver, would therefore be constantly exposed to this noise, except for the brief intervals when a message is being broadcast.

Technically speaking, it is more correct to say that the receiver develops a noise in the absence of the carrier wave onto which the message is modulated. In the interest of simplicity, however, the word "message" will be used instead of the more technically correct "carrier wave."

To prevent this continual exposure to noise, and still permit messages to come through, "squelch" circuits are incorporated into the receivers. These circuits act to mute the receiver in the presence of noise, and to "awaken" the receiver when a message is being received.

When a vehicle containing one of these receivers is in a fringe reception area, messages come in weakly. The listener, in order to avoid the possibility of losing a message, adjusts the squelch control to the point where the receiver will be awakened by any incoming signal, regardless of how weak it may be. This is known as the "threshold." At this setting, even momentary slight decreases in noise will also awaken the set for short intervals. When this happens, the awakened set amplifies the noise, which then emanates from the loudspeaker. The listener must therefore choose between missing a message or being subjected to bursts of noise.

If the receiver, instead of being in a vehicle, was part of an unattended repeater station, say at a remote inaccessible location, any variation in operating potentials, any aging of the tubes, or any change in the electrical components, would tend to upset the extremely critical squelch action. A change of the squelch action would be extremely unfortunate, because it would result in a shifting of the threshold, producing either (1) the inability of the receiver to awaken when a signal is received, or (2) the possibility that the receiver would always be reproducing noise.

It is therefore the principal object of my invention to provide an improved amplifier.

It is another object of my invention to provide an improved squelch control amplifier.

The attainment of this object and others will be realized from the following specification, taken in conjunction with the single drawing, which illustrates the basic concept of my invention.

My invention contemplates a feedback arrangement whereby minor changes in noise are compensated to reestablish the original threshold.

To aid in the explanation of my invention, the following terms will be used. "Upvolting" means raising the potential, without implying that the potential is negative or positive or undergoes any change of sign. Similarly, "downvolting" means lowering the potential.

The operation of a noise squelching circuit may be understood from FIG. 1, which shows an input circuit (discriminator 10) that operates on the received signal, and applies its output through a filter 11 to an output circuit (amplifier 12), which in turn energizes speaker 14. Filter circuit 11 has an audio bandpass characteristic, that is, it passes the audio frequencies but opposes the passage of others. Unfortunately, noise is a wideband phenomenon, so some noise occupies the audio range and passes through filter 11 to amplifier 12. In the absence of a message, a great deal of noise is present, and that portion in the audio range would appear at the loudspeaker, if there were no squelch circuit. Prior art circuits directed the noise signals through filter 13 and through the path shown by the dotted line to rectifier 16. Filter 13 has an audio band rejection characteristic, and acts to restrict the audio frequencies to the audio channel. Thus, filters 11 and 13 coact to separate the audio frequencies and the noise; directing the audio to the output circuit, and directing the noise to rectifier 16 which converts it to a quasi D.-C. noise signal. A filter circuit 18 causes the noise signal to appear as a "derived" D.-C. noise potential at control grid 20 of squelch control tube 22. Since tube 22 is normally conductive, as shown by the slash lines therethrough, the noise potential causes a current flow through load resistance 24. This flow downvolts anode 26 of tube 22, and, through coupling resistance 27, also downvolts grid 28 of the output tube (audio amplifier 12). The downvolting of control grid 28 cuts off audio tube 12, and therefore does not permit any signal, noise or otherwise, to appear at speaker 14. It may thus be seen that in the absence of a message, or conversely the presence of noise, the receiver is muted.

When the receiver picks up a message, the noise level decreases due to normal FM/PM receiver action. In the prior art circuit, the reduced noise signal is again rectified by tube 16, and its reduced amplitude downvolts grid 20 of control tube 22. This downvolting of the control grid upvolts anode 26 and grid 28 of audio tube 12. Tube 12 therefore becomes conductive, and the audio signal from circuit 10 is passed to speaker 14. It may therefore be seen that a high noise level, or the absence of a message, mutes the receiver; whereas a reduction of noise in the presence of a message, activates the output circuit (i.e. awakens the receiver) and controls the state of the audio tube.

Any convenient method may be used to bias the tubes to obtain desired manner of operation.

My invention compensates for minor changes of the noise level. It accomplishes this result by use of a feedback loop that operates in the following manner. A noise signal from discriminator 10 is applied to control grid 40 of compensation tube 38, which is normally conductive. The signal is amplified by tube 38, and is fed from anode 39 through rectifier 16 and filter 18 to grid 20 where it appears as a derived D.C. noise potential. Here it causes a current flow that establishes anode 26 at a given potential level; resistance 41 coupling this to grid 40. There it establishes a given grid bias, and therefore determines the amplification of tube 38.

When the noise level decreases, tube 38 produces a slightly lower derived noise potential at grid 20. This in turn upvolts anode 26, and resistance 41 couples this upvolting to grid 40; thus increasing the gain of tube 38 so that the derived noise potential at grid 20 is now increased. If, on the other hand, the noise level increases, tube 38 produces a higher derived noise potential at grid 20. The increased current through tube 22 downvolts anode 26, and resistance 41 downvolts grid 40. The reduced potential at grid 40 reduces the gain of tube 38, so that the derived noise potential at grid 20 is decreased. In this way, the feedback loop tends to compensate for changes in noise level. It is immaterial whether the increase in noise is actual, or due to variations in operating potentials, aging of tubes, changes of the components or other causes.

The compensation depends primarily upon the gain of tube 38, which is controlled by the bias at grid 40 which in turn is determined by the amount by which the potential at anode 26 is changed. I select the circuit parameters so that as the noise level decreases, the compensation also decreases. Thus, small changes in the noise level are completely compensated so that they have no effect; large changes are not compensated, and have their intended effect, i.e., the receiver is awakened at the noise level for which this result is desired.

As an added precaution, it is desirable that compensation tube 38 be disabled sharply, definitely, and completely when output tube 12 becames conductive. I accomplish this by using resistance 45 to couple cathode 43 of audio tube 12 to cathode 42 of compensation tube 38. When output tube 12 becomes conductive, the current therethrough upvolts cathode 43 and resistance 45 therefore upvolts cathode 42. In tube 38, the upvolted cathode cuts off conductivity, and thus completely disables the compensation circuitry.

Thus, due to my invention, FM or PM receivers may be compensated for minor changes in operating conditions, and yet produce a sharper transition for signals of a predetermined strength.

While I have described a preferred embodiment of my invention, it will be understood that I wish to be limited not by the foregoing description, but solely by the claims granted to me.

What is claimed is:

1. A compensated squelch circuit comprising: an audio tube having an output anode, an input grid, and a cathode; a loudspeaker connected to said anode of said audio tube; a discriminator to produce noise signals and audio signals; a connection between the output of said discriminator and said grid of said audio tube whereby said loudspeaker may produce sounds corresponding to said audio signals from said discriminator; a compensation tube having an output anode, an input grid, and a cathode; a connection between said output of said discriminator and said grid of said compensation tube whereby said noise signals may be amplified; a rectifier; a connection between said anode of said compensation tube and said rectifier whereby the output signal from said compensation tube may be rectified; a filter circuit connected to the output of said rectifier to filter the output thereof; a squelch control tube having an input grid and an output anode; a connection between the output of said filter circuit and said grid of said squelch control tube; a resistance connected between said anode of said squelch control tube and said grid of said compensation tube; a resitance connected between said anode of said squelch control tube and said grid of said audio tube; and a resistance connected between said cathode of said audio tube and said cathode of said compensation tube whereby when said audio tube becomes conductive it cuts off said compensation tube.

2. A compensated squelch circuit comprising: an audio tube having an output anode, an input grid, and a cathode; a loudspeaker connected to said anode of said audio tube; a discriminator to produce noise signals and audio signals; an audio signal bandpass filter connected between the output of said discriminator and said grid of said audio tube whereby said loudspeaker may produce sounds corresponding to said audio signals from said discriminator; a compensation tube having an output anode; an input grid, and a cathode; a noise pass bandpass filter connected between said output of said discriminator and said grid of said compensation tube whereby said noise signals may be amplified; a rectifier; a connection between said anode of said compensation tube and said rectifier whereby the output signal from said compensation tube may be rectified; a filter circuit connected to the output of said rectifier to filter the output thereof; a squelch control tube having an input grid and an output anode; a connection between the output of said filter circuit and said grid of said squelch control tube; a resistance connected between said anode of said squelch control tube and said grid of said compensation tube; and a resistance connected between said anode of said squelch control tube and said grid of said audio tube.

3. A compensated squelch circuit comprising: an output tube having an output terminal, and an input terminal; a utilization circuit connected to said output terminal of said output tube; a discriminator; a connection between the output of said discriminator and said input terminal of said output tube; a compensation tube having an output terminal, and an input terminal; a connection between said output of said discriminator and said input terminal of said compensation tube; a rectifier; a connection between said output terminal of said compensation tube and said rectifier; a squelch control tube having an input terminal and an output terminal; a connection between the output of said rectifier and said input terminal of said squelch control tube; a connection between said output terminal of said squelch control tube and said input terminal of said compensation tube; and a connection between said output terminal of said squelch control tube and said input terminal of said output tube.

4. A compensating circuit comprising: an output electron discharge device having an input electrode and an output electrode; a utilization circuit connected to said output electrode of said output device; an input circuit; a connection between the output of said input circuit and said input electrode of said output device; a second electron discharge device having an input electrode and an output electrode; a connection between said output of said input circuit and said input electrode of said second device; a rectifier; a connection between said output electrode of said second device and said rectifier; a third electron discharge device having an input electrode and an output electrode; a connection between the output of said rectifier and said input electrode of said third device; a connection between said output electrode of said third device and said input electrode of said second device; and a connection between said output electrode of said third device and said input terminal of said output electron discharge device.

5. A compensated squelch circuit comprising: an output circuit; means producing audio and noise signals; means applying said audio signals to said output circuit to produce sounds; a first electron discharge device; means permitting only said noise sginals to be applied to said first device to amplify said noise signals; means converting the output of said first device to a D.C. potential; a second electron discharge device; means applying said D.C. potential to said second device to control the state thereof; and means causing the output of said second device to compensate for changes in said noise signals at said first device and to control said output circuit whereby noise occurrence of a predetermined level prevents the production of sound in the absence of audio signals.

6. A compensated squelch circuit comprising: an output circuit; means producing first and second type signals; means applying said first type signals to said output circuit; a first electron discharge device; means permitting only said second type signals to be applied to said first device; means converting the output of said first device to a D.C. potential; a second electron discharge device; means applying said D.C. potential to said second device to control the state thereof; means causing the output from said second device to compensate for changes in said second type signals at said first device and to control said output circuit; and means causing said output from said output circuit to disable said first device whereby output from said output circuit is permitted in the presence of said first type signal and is prevented upon occurrence of a predetermined level of said second type signal.

References Cited in the file of this patent

UNITED STATES PATENTS

| | | |
|---|---|---|
| 2,273,680 | Wiegerinck | Feb. 17, 1942 |
| 2,589,711 | Lacy | Mar. 18, 1952 |
| 2,596,138 | Feiner et al. | May 13, 1952 |
| 2,891,146 | Sciurba | June 16, 1959 |